C. B. MIERCORT.
STARTER FOR EXPLOSION ENGINES.
APPLICATION FILED APR. 23, 1914.
1,120,516.
Patented Dec. 8, 1914.
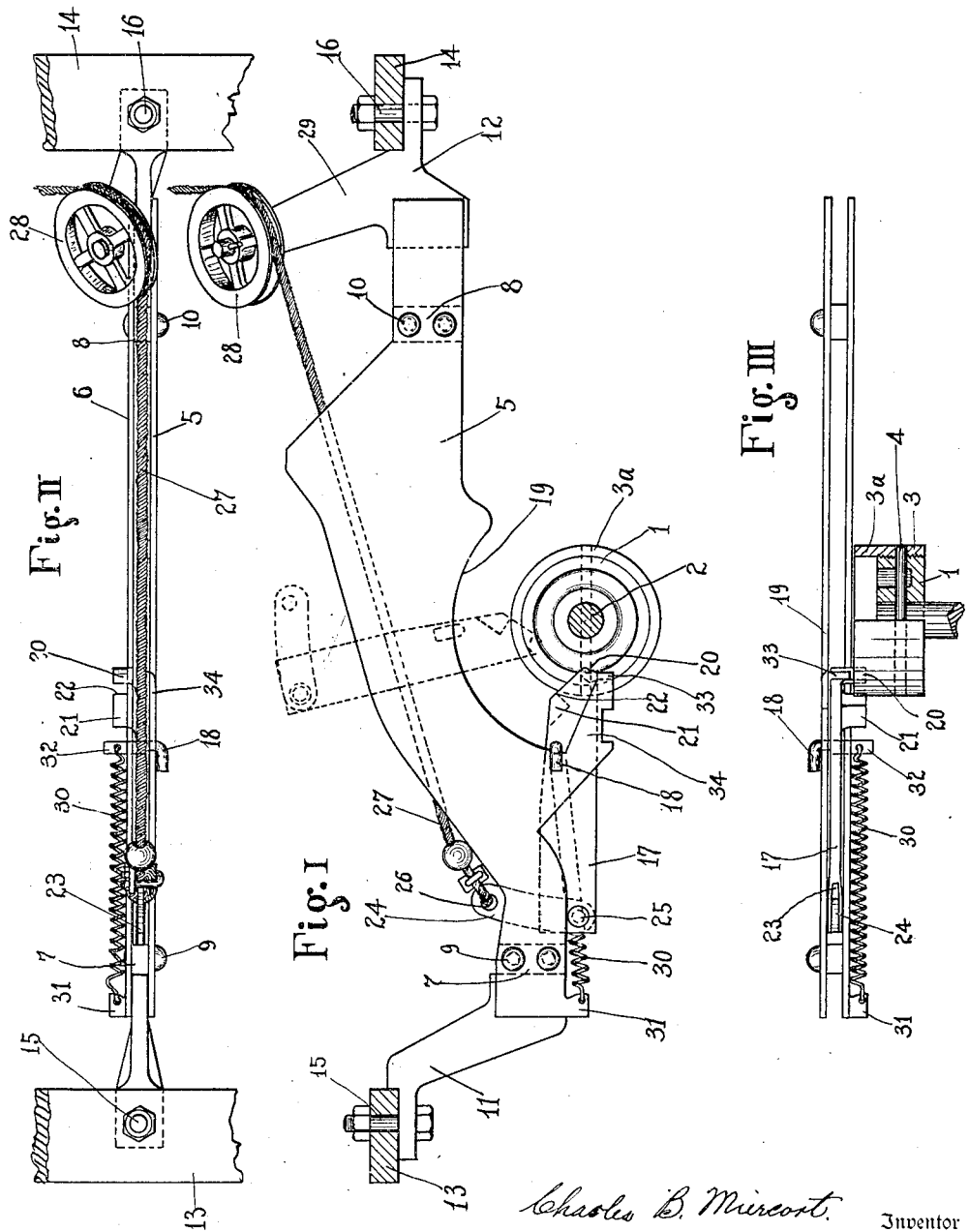
Charles B. Miercort, Inventor
Witnesses
By Mason Fenwick Lawrence
Attorneys

UNITED STATES PATENT OFFICE.

CHARLES B. MIERCORT, OF DENVER, COLORADO, ASSIGNOR TO THE DENVER FORD STARTER COMPANY, OF DENVER, COLORADO, A CORPORATION OF COLORADO.

STARTER FOR EXPLOSION-ENGINES.

1,120,516.  Specification of Letters Patent.  Patented Dec. 8, 1914.

Application filed April 23, 1914. Serial No. 833,964.

*To all whom it may concern:*

Be it known that I, CHARLES B. MIERCORT, a citizen of the United States, residing at Denver, in the county of Denver and State of Colorado, have invented certain new and useful Improvements in Starters for Explosion-Engines; and I do hereby declare the following to be a full, clear, and exact description of the invention, such as will enable others skilled in the art to which it appertains to make and use the same.

This invention relates to starting devices for explosion engines and has for an object to provide a device of that class which shall be simple and economical of construction and operation and easily, quickly and economically attached to or removed from such engines.

Another object is to provide a starter wherein the starting lever is not attached to the main shaft, and wherein when it is not in use it does not contact with said shaft or any part of the engine. The construction of the invention embodying this feature therefore requires little or no alteration in the engine itself.

Another feature of the present invention is the construction and disposition of the guide plates between which the lever moves, and the mechanism for swinging the lever, so that the actuating cable passes across within the hood on a line nearly horizontal and the starter therefore occupies a minimum of space. This feature involves mechanism for changing the direction of the pull imparted to said cable.

With these and other objects in view my invention comprises certain novel constructions, combinations and arrangements of parts as will be hereinafter more fully described and claimed and as shown in the accompanying drawing in which similar characters of reference indicate corresponding parts throughout the several views and in which—

Figure I. is a front elevation of my starter in position in an automobile, showing fragments of the car frame, a cross section of the drive shaft of the automobile and the fan belt wheel in elevation. Fig. II. is a top plan view of the starter, showing fragments of the car frame. Fig. III. is a view from underneath of the parts shown in Fig. II.

My starter may be used on any explosion engine having an exposed drive shaft but is primarily intended for use upon an automobile having a fan belt wheel or similar wheel mounted upon the drive shaft and a space along said shaft adjacent said wheel in which space the starter may be positioned. For example the present models of the Ford automobile have a fan belt wheel mounted upon the drive shaft and for a few inches above and along said shaft toward the radiator there is an unoccupied space in which the starter may be installed. Prior to installing my starter in such a car, I thread the periphery of the fan belt wheel 1 mounted upon drive shaft 2 and screw thereon an outer rim 3 wider than the rim of the wheel 1 and extending therebeyond as clearly shown at 3ª in Fig. III. The rim 3 is held in fixed relation to wheel 1 by any suitable means as pin 4.

The starting mechanism has a frame consisting of two guides or plates 5 and 6 secured in spaced relation to each other as by blocks 7 and 8 with bolts 9 and 10 passing therethrough, said frame being secured to the car frame in any suitable manner as by brackets 11 and 12 carried by the starter frame and bolted to the side bars 13 and 14 of the car frame as at 15 and 16.

Between the plates 5 and 6 of the starter frame is loosely disposed a lever 17 having a hook 18 for slidingly engaging the arcuate inner or guiding edge 19 of guide member 5. The lever 17 is further provided with dogs 20 and 21 positioned respectively within and without the extension or flange 3ª of the outer rim 3, the dog 21 having a sharp edge 22. At its opposite end lever 17 is bifurcated as at 23. Within the bifurcation a link 24 is pivotally mounted as at 25 at one end and at the opposite end is provided with a hole 26 or other suitable means to which the operating cable or wire 27 is attached as by the rope clamp illustrated. Adjacent said clamp is herein shown a globular or rounded runner 37 which is wider than the starter frame as seen in Fig. II, and may well be a ball strung onto the cable or wire 27. This runner travels on the upper guiding edges 29 of the members 5 and 6, which edges are shaped as best seen in Fig. I and may well be called a track along which the runner slides.

The wire 27 may pass to any convenient point of operation but preferably around guide wheel 28 suitably mounted upon bracket 12 and thence through the dash board of the car.

It will be evident that a pull upon wire 27 causes the runner 37 to start upward along the track 29, and the upper end of the link 24 follows it while the lower end 25 of said link causes the outer end of the lever 17 to move upward. The inclination of the track is such that a substantially or nearly horizontal pull on the wire or cable 27 is, by means of this runner and link, converted into a substantially or nearly vertical movement of the outer end of the lever; but, as soon as the latter is passed between the members 5 and 6 and has risen about half way to the dotted position shown in Fig. I, the pull of the wire 27 on the lever is direct or substantially so. It follows that the movement of the lever is practically the same as it would be if its inner end were journaled on the shaft 2, but attention is directed to the fact that this lever is in no way connected with said shaft, being loosely mounted between the members 5 and 6. At the inception of the upward movement of the lever, it is canted slightly from a position strictly radial to the engine shaft 2, and the dog 20 will be drawn against the inside of extended rim 3ª while the sharp edge 22 of dog 21 will be forced against the outer side thereof with the result that the dogs will grip said extended rim 3ª; and that, as lever 17 is pulled by wire 27 over to the dotted line position in Fig. I, it will carry the rim 3ª with it, thus revolving the belt wheel 1 and with it the drive shaft 2 and starting the engine.

Tension spring 30 is provided attached at one end to lug 31 on guide member 6 and at the other end to lug 32 on lever 17, which lug is opposite to and may be integral with the stem of hook 18 as shown at Fig. III. Attention is directed to the fact that the normal disposition of this spring is substantially horizontal, and its tendency is to draw the lever longitudinally away from the main shaft 2, on a line radial to the latter. This tendency is resisted by the hook 18 coming into contact with the edge 19 at a time when both dogs are out of engagement with the extended rim 3ª, and therefore when the starter is idle no parts thereof are in contact with the running parts of the engine. When tension is released from wire 27 spring 30 retracts lever 17, throwing dogs 20 and 21 out of engagement with rim 3ª and drawing the lever back to the starting position shown by solid lines in Fig. I. Hook 18 holds lever 17 against outward movement thus preventing dog 20 from being drawn into engagement with the revolving rim 3ª by the pull of spring 30 on lever 17 after tension is released from wire 27.

Rest 33 is provided on arm 34 of guide member 5 and normally dog 20 rests thereon. Also, in case the engine should kick back and carry with it the lever 17 with dogs 20 and 21 still in engagement with rim 3ª, it is evident that when dog 20 contacts with rest 33 it will stop while the lever 17 will drop to solid line position at Fig. II, thus releasing the dogs from engagement with the rim.

What I claim is:

1. A starter for explosion engines having a drive shaft comprising a flange rigid with the shaft and extending parallel thereto, a lever, a projection rigid with the lever and located upon one side of the flange, a second projection rigid with the lever and located upon the other side of the flange, means to raise the lever to cause the projections to engage the opposite sides of the flange, and means to hold the lever against movement longitudinally with respect to the shaft.

2. A starter for explosion engines having a drive shaft comprising a flange rigid with the shaft and extending parallel thereto, a lever having a pair of projections rigid therewith, one adapted to engage the outer side of the flange while the other engages the inner side of the flange, means to raise the lever to cause the projections to engage the flange, guide means for the lever provided with an arcuate edge having said shaft as its center, and means rigid with the lever overhanging said arcuate edge.

3. In a starter for explosion engines having a drive shaft and a rim wheel thereon, the combination with a lever disconnected from the shaft and wheel and having dogs projecting respectively inside and outside of the rim of said wheel; of a pair of guide plates between which said lever is loosely disposed, one of the plates having an arcuate edge struck around said shaft and an arm provided with a rest adapted to support one of said lugs when the lever lies inactive, a projection from the lever traveling along said arcuate edge as the lever is swung, means for swinging the lever, and yielding means opposed to said swinging means and drawing said projection against said edge, for the purpose set forth.

4. In a starter for explosion engines having a drive shaft and a wheel thereon, the combination with a lever disconnected from the shaft and wheel and having means for gripping the wheel when the lever is canted; of a pair of guide plates between which said lever is loosely disposed, one of the plates having an arcuate edge struck around said shaft and a rest adapted to support the lever when it lies inactive, a projection from the lever traveling along said arcuate edge as the lever is swung, means for so swinging the lever, and a spring opposed to said swinging means and drawing said projection against said edge, for the purpose set forth.

5. In a starter for explosion engines having a drive shaft and a wheel thereon, the combination with a lever disconnected from the shaft and wheel and having means for gripping the wheel when the lever is canted; of a pair of guide plates between which said lever is loosely disposed, one of the plates having an arcuate edge struck around said shaft and means to support the lever when it lies horizontal and inactive, a projection from the lever traveling along said arcuate edge as the lever is swung upward, means for so swinging the lever, and a contractile spring for drawing said lever to inactive position.

6. In a starter for explosion engines having a drive shaft and a rim wheel thereon, the combination with a lever disconnected from the shaft and wheel and having dogs projecting respectively inside and outside of the rim of said wheel; of a guide plate alongside which the lever is loosely disposed, the plate having an arcuate lower edge struck around said shaft and a rest at the lower end of said edge projecting toward the shaft, a hook projecting from the lever and engaging said edge at a time when its dogs are out of contact with said rim wheel and the lever lies substantially horizontal, a spring normally drawing the lever away from the shaft and wheel and holding the hook in such engagement, and means for raising the outer end of the lever manually.

7. In a starter for explosion engines having a drive shaft and a wheel thereon, the combination with a lever disconnected from the shaft and wheel and having means to grip said wheel when the lever is canted; of a guide plate alongside which the lever is loosely disposed, the plate having an arcuate lower edge and a track along its upper edge, means projecting from the lever and engaging said arcuate edge, a spring normally drawing the lever away from the shaft and wheel, a link rising from the outer end of the lever, an operating member connected with the upper end of the link, and a runner on said member traveling on said track, for the purpose set forth.

8. In a starter for explosion engines having a drive shaft and a rim wheel thereon, the combination with a lever disconnected from the shaft and wheel and having dogs projecting respectively inside and outside of the rim of said wheel; of a guide plate alongside which the lever is loosely disposed, the plate having an arcuate lower edge struck around said shaft, a hook projecting from the lever and engaging said edge at a time when its dogs are out of contact with said rim wheel and the lever lies substantially horizontal, a spring normally drawing the lever away from the shaft and wheel and holding the hook in such engagement, the upper edge of said plate having a track, a link rising from the outer end of the lever, an operating member connected with the upper end of the link, and a runner on said member traveling on said track, for the purpose set forth.

9. In a starter for explosion engines having a drive shaft and a flange rigid with the shaft and parallel thereto, the combination with a lever normally disconnected from the shaft and flange and having means for gripping the flange when the lever is canted; of a pair of guide plates between which said lever is loosely disposed, one of the plates having a rest adapted to support the lever when it lies inactive, means for swinging the lever and a spring opposed to said swinging means.

10. In a starter for explosion engines having a drive shaft and a flange rigid with the shaft and parallel thereto, the combination with a lever normally disconnected from the shaft and flange and having means for gripping the flange when the lever is canted; of a pair of guide plates between which said lever is loosely disposed, one of the plates having means to support the lever when it lies inactive, means for swinging the lever, and a contractile spring for drawing said lever to inactive position.

In testimony whereof I affix my signature in presence of two witnesses.

CHARLES B. MIERCORT.

Witnesses:
 CARLE WHITEHEAD,
 FRANK D. TAGGART.

Copies of this patent may be obtained for five cents each, by addressing the "Commissioner of Patents, Washington, D. C."